(12) United States Patent
Uematsu et al.

(10) Patent No.: US 9,523,611 B2
(45) Date of Patent: Dec. 20, 2016

(54) SURFACE TEMPERATURE MEASURING APPARATUS AND SURFACE TEMPERATURE MEASURING METHOD

(71) Applicant: NIPPON STEEL & SUMITOMO METAL CORPORATION, Tokyo (JP)

(72) Inventors: Chihiro Uematsu, Tokyo (JP); Yutaka Wakasu, Tokyo (JP); Tatsuro Honda, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 14/419,376

(22) PCT Filed: Aug. 21, 2013

(86) PCT No.: PCT/JP2013/072258
§ 371 (c)(1),
(2) Date: Feb. 3, 2015

(87) PCT Pub. No.: WO2014/030661
PCT Pub. Date: Feb. 27, 2014

(65) Prior Publication Data
US 2015/0226610 A1 Aug. 13, 2015

(30) Foreign Application Priority Data
Aug. 22, 2012 (JP) ................. 2012-183193

(51) Int. Cl.
*G01J 5/08* (2006.01)
*G01J 5/06* (2006.01)
(Continued)

(52) U.S. Cl.
CPC ............ *G01J 5/0875* (2013.01); *G01J 5/0003* (2013.01); *G01J 5/0022* (2013.01); *G01J 5/0205* (2013.01);
(Continued)

(58) Field of Classification Search
CPC .......... G01J 5/00; G01J 5/0003; G01J 5/0022; G01J 5/0205; G01J 5/029; G01J 5/042; G01J 5/043; G01J 5/047; G01J 5/048; G01J 5/06; G01J 5/08; G01J 5/0818; G01J 5/0821; G01J 5/084; G01J 5/0875

See application file for complete search history.

(56) References Cited

U.S. PATENT DOCUMENTS 6,357,909 B1   3/2002   Watanabe

FOREIGN PATENT DOCUMENTS

CN      1239544 A    12/1999
EP      0937972 A1    8/1999
(Continued)

OTHER PUBLICATIONS

International Search Report, mailed Sep. 17, 2013, issued in PCT/JP2013/072258.
(Continued)

*Primary Examiner* — Mark R Gaworecki
(74) *Attorney, Agent, or Firm* — Birch, Stewart, Kolasch & Birch, LLP

(57) ABSTRACT

A surface temperature measuring apparatus comprising a radiation thermometer configured to detect thermal radiation light emitted from a surface of a temperature measurement target material in a cooling process with water, a housing having an opening on a temperature measurement target material side, the housing storing, in an inside of the housing, at least a light receiving unit of the radiation thermometer among structural elements of the radiation thermometer, and an optical glass that is fit and sealed in the inside of the housing between the temperature measurement target material and the light receiving unit of the radiation thermometer, the optical glass being configured to transmit (Continued)

the thermal radiation light. The optical glass has, on the temperature measurement target material side, an end surface adjacent to the surface of the temperature measurement target material. A surface temperature measuring method is also provided.

10 Claims, 7 Drawing Sheets

(51) Int. Cl.
    *G01J 5/04* (2006.01)
    *G01J 5/00* (2006.01)
    *G01J 5/02* (2006.01)
(52) U.S. Cl.
    CPC ............... *G01J 5/029* (2013.01); *G01J 5/042* (2013.01); *G01J 5/043* (2013.01); *G01J 5/047* (2013.01); *G01J 5/048* (2013.01); *G01J 5/06* (2013.01); *G01J 5/084* (2013.01); *G01J 5/0818* (2013.01); *G01J 5/0821* (2013.01)

(56) References Cited

FOREIGN PATENT DOCUMENTS

| GB | 1561614 A | 2/1980 |
|----|-----------|--------|
| JP | 6-25741 U | 6/1984 |
| JP | 59-100224 A | 6/1984 |
| JP | 3-69974 B2 | 11/1991 |
| JP | 4-204220 A | 7/1992 |
| JP | 8-295950 A | 11/1996 |
| JP | 2006-17589 A | 1/2006 |
| JP | 2007-17408 A | 1/2007 |

OTHER PUBLICATIONS

Written Opinion of the International Searching Authority, mailed Sep. 17, 2013, issued in PCT/JP2013/072258.
Ukrainian Office Action for Ukrainian Application No. a201500310, dated Feb. 11, 2016, with an English translation.
Australian Office Action dated Mar. 18, 2016, issued in Australian Patent Application No. 2013306802.
Extended European Search Report for European Application No. 13830623.8, dated Apr. 15, 2016.
Chinese Office Action dated Aug. 19, 2016, issued in Chinese Patent Application No. 201380043455.5.

SURFACE TEMPERATURE MEASURING APPARATUS AND SURFACE TEMPERATURE MEASURING METHOD

TECHNICAL FIELD

The present invention relates to an apparatus that measures a surface temperature of a temperature measurement target material such as a steel material by radiant temperature measuring, and a method of measuring the same. The present invention particularly relates to a surface temperature measuring apparatus that is capable of accurately measuring a surface temperature of a temperature measurement target material such as a steel material (e.g., a wheel, a steel pipe, a steel sheet, or a rail) in a cooling process with water, and a method of measuring the same.

BACKGROUND ART

In order to improve the quality and productivity of a temperature measurement target material such as a wheel, a steel pipe, a steel sheet, or a rail, it has become important to manage the temperature of the temperature measurement target material in a cooling process. When the surface temperature of the temperature measurement target material is measured by use of a radiation thermometer in a cooling process in a hot rolling line or a heat treatment-and-cooling line of the temperature measurement target material, for example, sometimes there may be steam or scattered cooling water between the temperature measurement target material and the radiation thermometer. Alternatively, a surface of the temperature measurement target material may be covered with a water film or be submerged. Under such an environment, thermal radiation light emitted from the temperature measurement target material may be absorbed into water vapor, steam, cooling water, or the like, or may be scattered, and accordingly, the measured temperature value may include an error or the measurement may fail.

Accordingly, in order to reduce errors in measuring the temperature (hereinafter also referred to as temperature measurement errors), generated by the above factors, and to enable accurate radiant temperature measuring, there have been proposed various methods of measuring a surface temperature of a steel material according to the related art. For example, Patent Document 1 proposes a method of measuring a surface temperature of a steel material by forming a water column between a radiation thermometer and the surface of the steel material by ejection of purge water from a nozzle toward the surface of the steel material, and by detecting the radiant energy of the thermal radiation light emitted from the steel material through the water column.

More specifically, with the temperature measuring method disclosed in Patent Document 1, a water column is formed between a radiation thermometer and a measurement target. The radiation thermometer is configured to measure a surface temperature of the measurement target on the basis of the radiant energy emitted from the measurement target. From all the radiant energy emitted from the measurement target, part of the radiant energy is absorbed into the water column. Thus, considering the absorption, while the radiant energy is corrected, the surface temperature of the measurement target is measured by use of the radiation thermometer. This method is characterized by setting the temperature of the water column to 60° C. or higher to form the water column.

With the method disclosed in Patent Document 1, since the water column is formed between the radiation thermometer and the measurement target, water vapor or scattered water is unlikely to enter a part where the water column is formed, and it is possible to reduce the temperature measurement errors caused by absorption or scattering of the radiant energy by water vapor or scattered water. Further, with the method disclosed in Patent Document 1, since the temperature of the water column is set to 60° C. or higher, a boiling film is likely to be formed on the surface of the measurement target in contact with the water column. Accordingly, it becomes possible to suppress a decrease in the surface temperature of the measurement target and to reduce cooling unevenness of the measurement target without damaging the representativeness of the measured temperature value, which is advantageous.

However, the method disclosed in Patent Document 1 has the following problems. A heater for increasing the temperature of the water column to 60° C. or higher is necessary. A high energy cost is also necessary to increase the temperature of the water. Further, because a thickness measuring apparatus for measuring the thickness of the water column (using an ultrasonic system, for example) is necessary, the dimension of the entire apparatus is large, and accordingly, it becomes difficult to install the apparatus in a narrow space such as a space between steel material carrying rolls. Furthermore, even when the thickness measuring apparatus is installed, the maintainability may be hindered because the attachment and detachment may be troublesome, and a trouble of the thickness measuring apparatus may degrade the stability and reliability of the measured temperature value.

In order to solve at least one of the above problems and the like of the method disclosed in Patent Document 1, the present inventors have proposed a method disclosed in Patent Document 2. Specifically, the method disclosed in Patent Document 2 is a method of measuring a surface temperature of a temperature measurement target steel material by detecting thermal radiation light emitted from the bottom surface of the temperature measurement target steel material by use of a radiation thermometer that is disposed to be opposed to the bottom of the temperature measurement target steel material through purge water ejected from a nozzle toward the bottom surface of the temperature measurement target steel material. With this method, on the basis of the position of a path line of the temperature measurement target steel material, all heads of the purge water are set within a predetermined range (claim 2 of Patent Document 2). Further, this method proposes to set the wavelength of the thermal radiation light detected by the radiation thermometer to 0.9 μm or shorter (claim 3 of Patent Document 2).

According to the above method disclosed in Patent Document 2, since all heads of the purge water are set within a predetermined range, collision pressure of the purge water on the bottom surface of the temperature measurement target steel material is suppressed, and even when the purge water is at room temperature, cooling can be suppressed. Accordingly, according to the method disclosed in Patent Document 2, it becomes possible to obtain the advantage that the high energy cost for increasing the temperature of the water, which is necessary in Patent Document 1, is unnecessary. Further, by setting the wavelength of the thermal radiation light detected by the radiation thermometer to 0.9 μm or shorter, it becomes possible to obtain the advantage that the thickness measuring apparatus for measuring the thickness of the water column is unnecessary.

However, according to the above method disclosed in Patent Document 2, in a case in which the temperature of the top surface, side surfaces, and the like of the temperature measurement target steel material is measured, the purge water collides with the temperature measurement target steel material, and accordingly, temperature measurement errors may be generated by cooling of the surface of the temperature measurement target steel material. Further, since the wavelength of the thermal radiation light detected by the radiation thermometer is set to 0.9 μm or shorter, the lower limit of the surface temperature of the steel material which can be subjected to radiant temperature measuring is approximately 500° C. Considering recent requirement for high quality of the steel material, it has become important to manage the surface temperature in a low temperature region of approximately 200° C. Accordingly, it is difficult to manage appropriate temperatures with the method by which only the surface temperature of approximately 500° C. or higher can be measured.

In addition, as a technique to measure the surface temperature of a temperature measurement target material, generally, the temperature is measured by pressing a temperature sensor of a thermocouple wire lightly on the temperature measurement target material. The temperature sensor of the thermocouple is fixed on a rear surface of a contact plate at the edge of a temperature measurement unit. However, since the temperature sensor of the thermocouple wire is pressed by the contact plate on the temperature measurement target material, in a cooling process of water cooling, water enters a space between the contact plate and the temperature measurement target material, and the temperature sensor of the thermocouple wire contacts the water. Accordingly, it becomes difficult to measure the surface temperature of the temperature measurement target material accurately.

PRIOR ART DOCUMENT(S)

Patent Document(s)

[Patent Document 1] JP H8-295950A
[Patent Document 2] JP 2006-17589A

SUMMARY OF THE INVENTION

Problem(s) to be Solved by the Invention

The present invention has been made to solve at least one of the problems of the related art and aims to provide a surface temperature measuring apparatus that is capable of accurately measuring a surface temperature of a temperature measurement target material such as a steel material (e.g., a wheel, a steel pipe, a steel sheet, or a rail) in a cooling process with water, and a method of measuring the same.

Means for Solving the Problem(s)

In order to solve at least one of the above problems, according to the present invention, there is provided a surface temperature measuring apparatus including a radiation thermometer configured to detect thermal radiation light emitted from a surface of a temperature measurement target material in a cooling process with water, a housing having an opening on a temperature measurement target material side, the housing storing, in an inside of the housing, at least a light receiving unit of the radiation thermometer among structural elements of the radiation thermometer, and an optical glass that is fit and sealed in the inside of the housing between the temperature measurement target material and the light receiving unit of the radiation thermometer, the optical glass being configured to transmit the thermal radiation light. The optical glass has, on the temperature measurement target material side, an end surface that is adjacent to the surface of the temperature measurement target material.

In the surface temperature measuring apparatus, the end surface of the optical glass on the temperature measurement target material side may be located at a position where water is present in a space between the end surface of the optical glass on the temperature measurement target material side and the surface of the temperature measurement target material, and the light receiving unit of the radiation thermometer may receive the thermal radiation light emitted from the surface of the temperature measurement target material through water that is present in the space between the surface of the temperature measurement target material and the end surface of the optical glass on the temperature measurement target material side.

The radiation thermometer may detect light having any one of wavelength bands of 0.7 to 0.9 μm, 1.0 to 1.2 μm, and 1.6 to 1.8 μm.

The surface temperature measuring apparatus may include a keeping member configured to keep a gap between the surface of the temperature measurement target material and the end surface of the optical glass on the temperature measurement target material side substantially constant.

The surface of the temperature measurement target material on which the radiation thermometer detects the thermal radiation light may be a plane that is substantially vertical to a horizontal direction, and the surface temperature measuring apparatus may calculate a measured temperature value by correcting an output value of the radiation thermometer by use of a transmittance of the thermal radiation light with respect to a thickness of water corresponding to a length that is substantially half of the gap between the surface of the temperature measurement target material and the end surface of the optical glass on the temperature measurement target material side.

The surface of the temperature measurement target material on which the radiation thermometer detects the thermal radiation light may be a top surface of the temperature measurement target material that is substantially parallel to a horizontal direction, and the gap between the surface of the temperature measurement target material and the end surface of the optical glass on the temperature measurement target material side may be 2.5 mm or shorter.

The surface of the temperature measurement target material on which the radiation thermometer detects the thermal radiation light may be a plane that is substantially vertical to a horizontal direction, the light receiving unit of the radiation thermometer may receive the thermal radiation light emitted through the water that is present in the space between the surface of the temperature measurement target material and the end surface of the optical glass on the temperature measurement target material side, and the gap between the surface of the temperature measurement target material and the end surface of the optical glass on the temperature measurement target material side may be 1.0 mm or shorter.

The surface temperature measuring apparatus may include a water supply apparatus configured to supply water to the space between the surface of the temperature measurement target material and the end surface of the optical glass on the temperature measurement target material side.

In order to solve at least one of the above problems, according to another aspect of the present invention, there is provided a surface temperature measuring apparatus including a radiation thermometer configured to detect thermal radiation light emitted from a surface of a temperature measurement target material in a cooling process with water, a housing having an opening on a temperature measurement target material side, the housing storing, in an inside of the housing, at least a light receiving unit of the radiation thermometer among structural elements of the radiation thermometer, an optical glass that is fit and sealed in the inside of the housing between the temperature measurement target material and the light receiving unit of the radiation thermometer, the optical glass being configured to transmit the thermal radiation light, and a keeping member configured to keep a gap between a surface of the temperature measurement target material and an end surface of the optical glass on the temperature measurement target material side substantially constant.

In order to solve at least one of the above problems, according to another aspect of the present invention, there is provided a surface temperature measuring method of measuring a surface temperature of a temperature measurement target material by detecting, by use of a radiation thermometer, thermal radiation light emitted from a surface of the temperature measurement target material in a cooling process with water, the method including interposing an optical glass configured to transmit the thermal radiation light between the temperature measurement target material and a light receiving unit of the radiation thermometer, and locating an end surface of the optical glass on a temperature measurement target material side adjacently to the surface of the temperature measurement target material and measuring the surface temperature of the temperature measurement target material.

In a case in which the temperature measurement target material is a steel material having a disk shape, a columnar shape, or a cylindrical shape having an outer peripheral surface, when measuring the surface temperature of the temperature measurement target material, a temperature of the outer peripheral surface of the temperature measurement target material may be measured by use of the radiation thermometer while the gap between the outer peripheral surface of the temperature measurement target material and the end surface of the optical glass on the temperature measurement target material side is kept substantially constant, in a state in which the temperature measurement target material is rotated around a center axis of the temperature measurement target material as a rotation center and the outer peripheral surface of the temperature measurement target material is cooled by water.

Effect(s) of the Invention

As described above, according to the present invention, it is possible to provide a surface temperature measuring apparatus that is capable of accurately measuring a surface temperature of a temperature measurement target material such as a steel material (e.g., a wheel, a steel pipe, a steel sheet, or a rail) in a cooling process with water, and a method of measuring the same.

BRIEF DESCRIPTION OF THE DRAWING(S)

Figure 6:
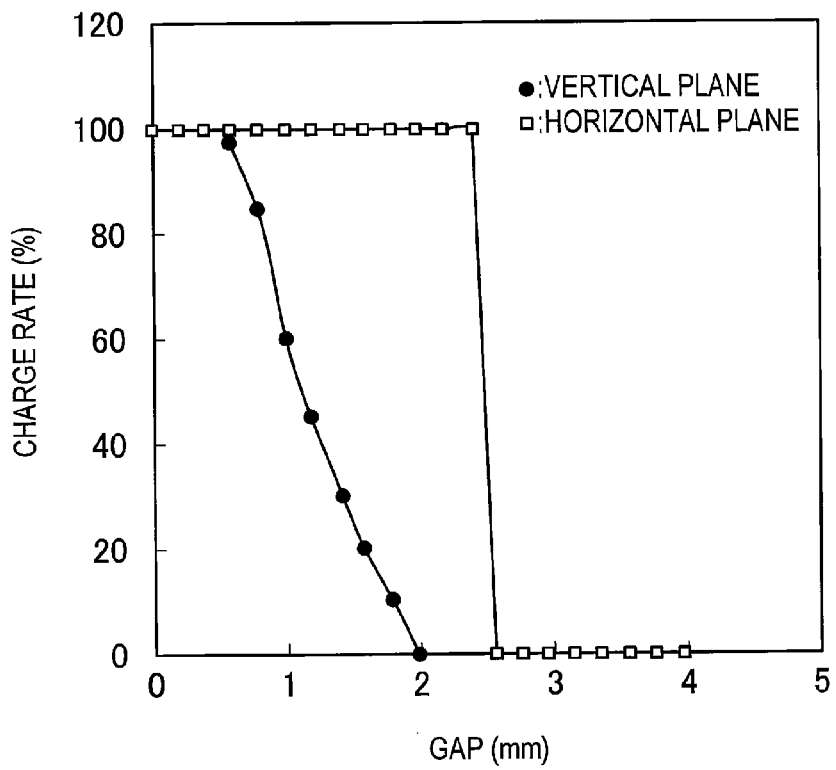

FIG. 6 is a graph showing results of observation of a state of water that is present between a steel sheet and an end surface of an optical glass by a gap between a top surface (horizontal plane) of the steel sheet that is substantially parallel to a horizontal direction or a plane (vertical plane) of the steel sheet that is substantially vertical to the horizontal direction and the end surface of the optical glass.

Figure 7:
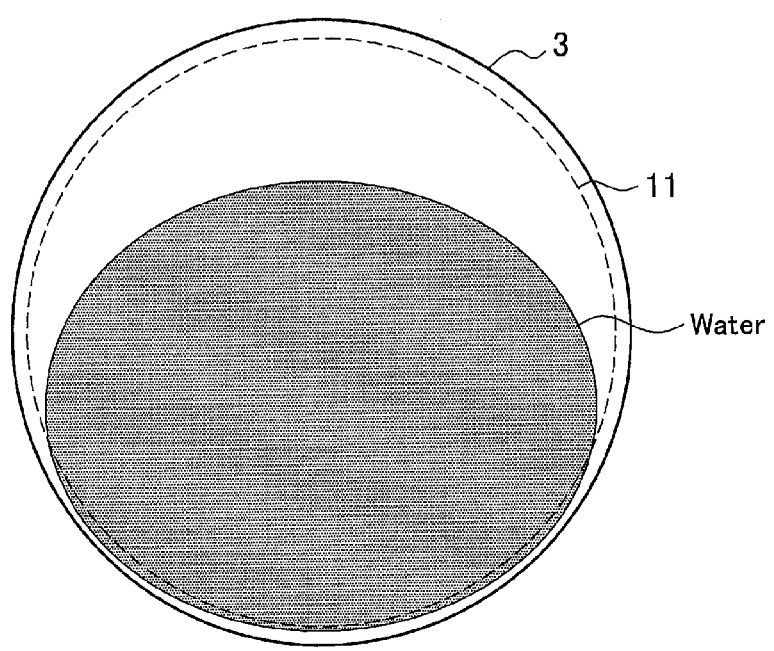

FIG. 7 shows an example of a charge state of water that is present between a surface of a temperature measurement target material and an end surface of an optical glass on a temperature measurement target material side.

Figure 8:
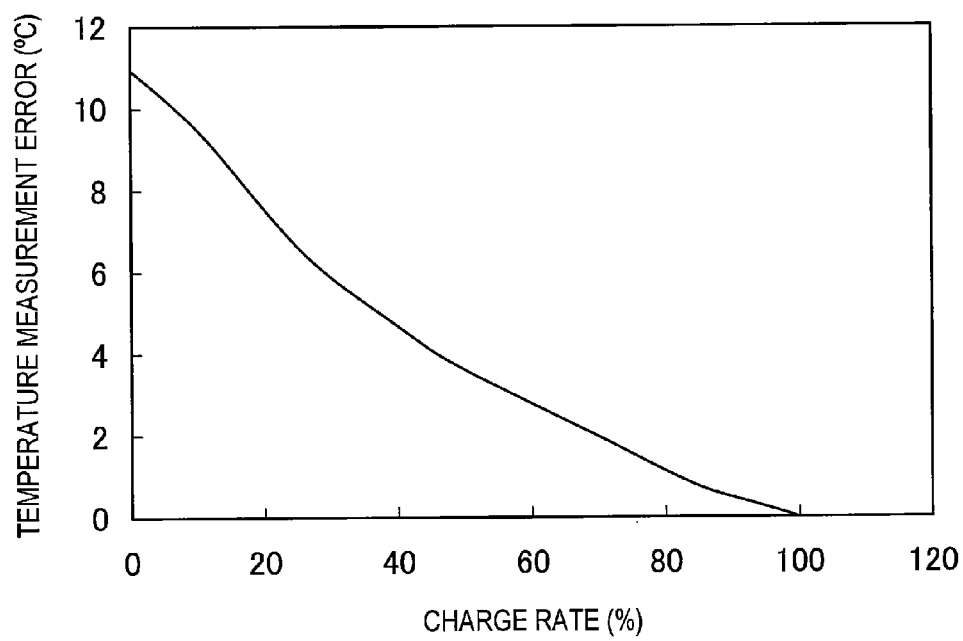

FIG. 8 is a graph showing an example of a relation between a charge rate of water and a temperature measurement error.

Figure 9:
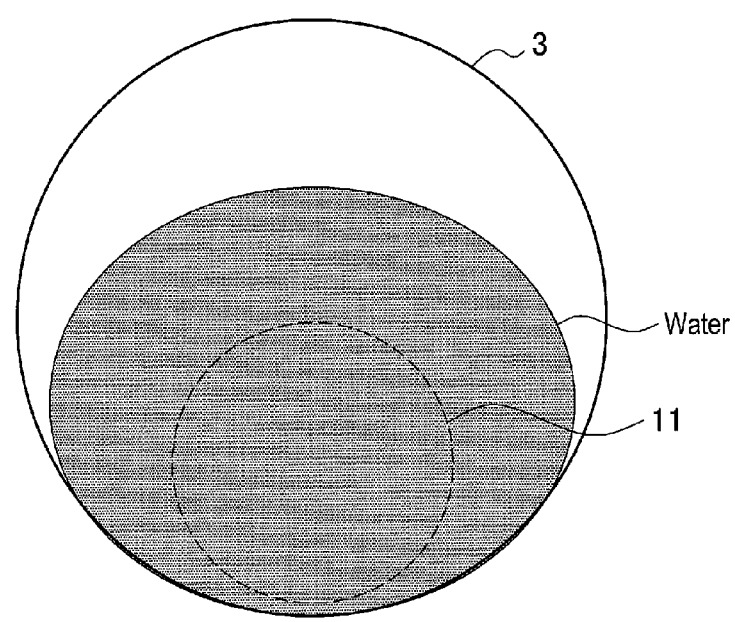

FIG. 9 shows a relation between a part where water is charged and a measurement field of a detection unit of a radiation thermometer.

Figure 10:
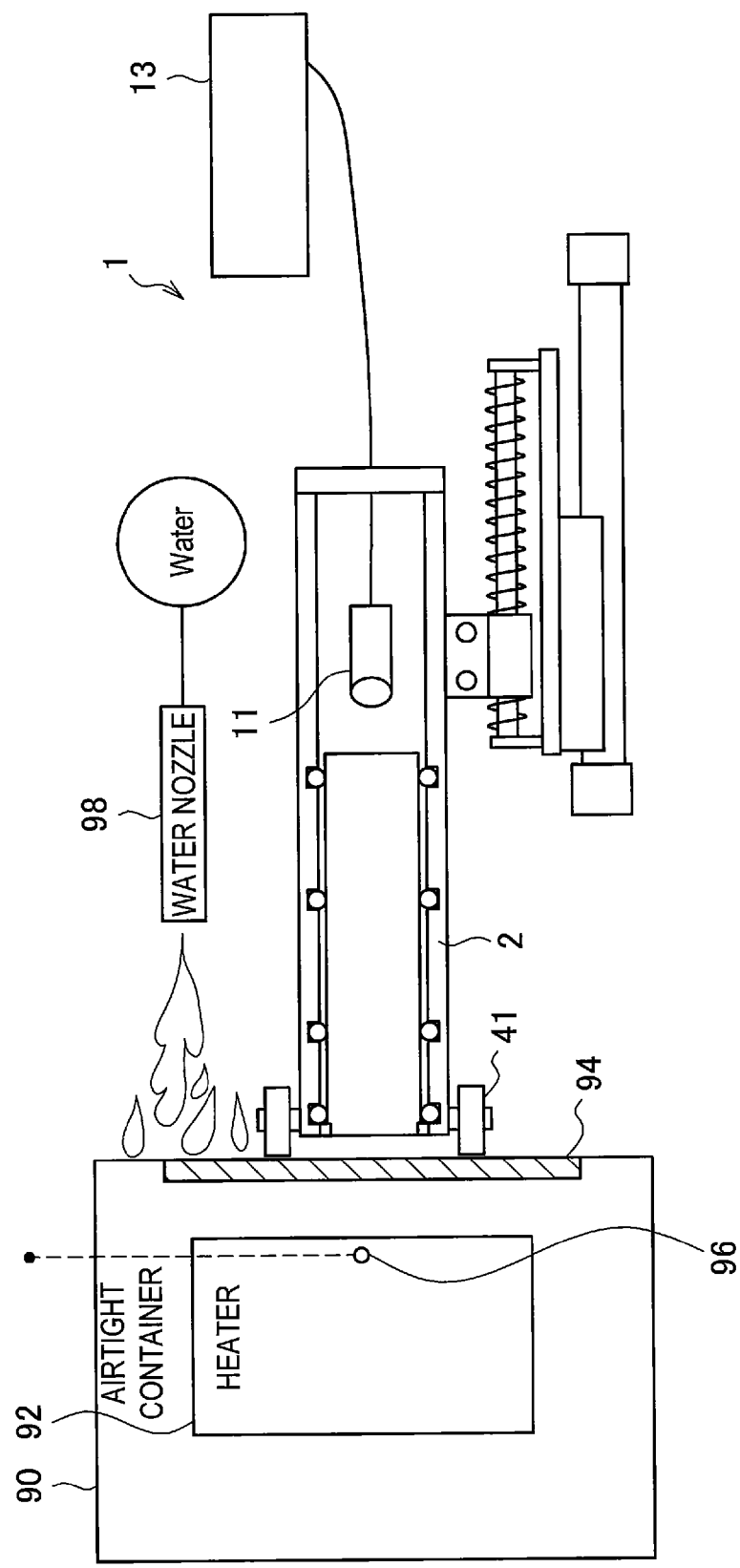

FIG. 10 is a schematic diagram showing an experimental apparatus for evaluating accuracy of surface temperature measurement on a vertical plane of a steel sheet in a cooling process with water.

Figure 11:
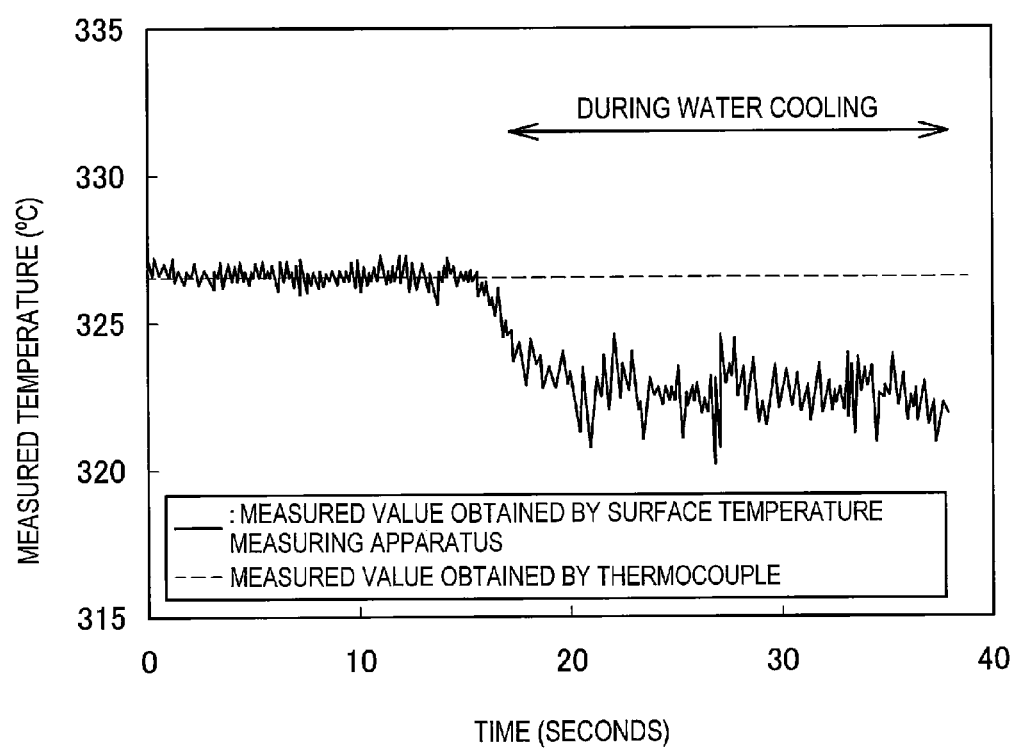

FIG. 11 is a graph showing temperature measurement results obtained by an experimental apparatus shown in FIG. 10.

MODE(S) FOR CARRYING OUT THE INVENTION

1. Overview of the Present Invention

A surface temperature measuring apparatus according to an embodiment of the present invention will be described below. First, an overview of the surface temperature measuring apparatus according to this embodiment will be described.

The surface temperature measuring apparatus according to this embodiment includes a radiation thermometer configured to detect thermal radiation light emitted from a surface of a temperature measurement target material in a cooling process with water, a housing having an opening on a temperature measurement target material side, the housing storing, in an inside of the housing, at least a light receiving unit of the radiation thermometer among structural elements of the radiation thermometer, and an optical glass that is fit and sealed in the inside of the housing between the temperature measurement target material and the light receiving unit of the radiation thermometer, the optical glass being configured to transmit the thermal radiation light. Further, an end surface of the optical glass on the temperature measurement target material side is adjacent to the surface of the temperature measurement target material.

In the surface temperature measuring apparatus according to this embodiment, the housing has the opening on the temperature measurement target material side and stores, in the inside of the housing, at least the light receiving unit of the radiation thermometer among structural elements of the radiation thermometer. Further, the optical glass that is interposed between the temperature measurement target material and the light receiving unit of the radiation thermometer transmits the thermal radiation light. Accordingly, the thermal radiation light emitted from the surface of the temperature measurement target material is received by the light receiving unit of the radiation thermometer through the opening of the housing and the optical glass. Note that the entire radiation thermometer may be stored in the housing, or the light receiving unit of the radiation thermometer may be stored in the housing and the structural elements other than the light receiving unit of the radiation thermometer may be provided outside of the housing.

In general, in a cooling process, there is water vapor or scattered water on the periphery of the temperature measurement target material. Accordingly, the water vapor or the scattered water may absorb or scatter the radiant energy, which may result in a decrease in the radiant energy of the thermal radiation light detected by the radiation thermometer and the generation of an error in the measurement (hereinafter also referred to as measurement error). It is possible to reduce the effects of the water vapor and the scattered water if the radiation thermometer is installed adjacently to the temperature measurement target material; however, in this case, the heat resistance or waterproof property of the radiation thermometer may be matter. In the surface temperature measuring apparatus according to this embodiment, the optical glass is fit and sealed in the inside of the housing between the temperature measurement target material and the light receiving unit of the radiation thermometer. Accordingly, the radiation thermometer is prevented from being directly subjected to heat emitted from the temperature measurement target material, and water is unlikely to enter the inside of the housing through the end of the opening of the housing and the light receiving unit of the radiation thermometer. Therefore, it is possible to secure the heat resistance and waterproof property of the radiation thermometer.

Further, since the end surface of the optical glass on the temperature measurement target material side is adjacent to the temperature measurement target material, water vapor, scattered water, and cooling water are unlikely to enter a space between the surface of the temperature measurement target material and the end surface of the optical glass on the temperature measurement target material side. Further, even when cooling water and the like enter, the cooling water entering the space between the surface of the temperature measurement target material and the end surface of the optical glass on the temperature measurement target material side will have a surface tension so as to be kept steady in this space. Accordingly, it becomes possible to reduce temperature measurement errors caused by absorption or scattering of the radiant energy by water vapor or scattered water.

Here, the state in which the cooling water kept steady in the space between the surface of the temperature measurement target material and the end surface of the optical glass on the temperature measurement target material side includes not only the state in which the cooling water is completely charged in the space between the surface of the temperature measurement target material and the end surface of the optical glass on the temperature measurement target material side but also the state in which the cooling water is kept steady in a part of the space between the surface of the temperature measurement target material and the end surface of the optical glass on the temperature measurement target material side. Specifically, for example, in a case in which the surface of the temperature measurement target material that detects the thermal radiation light is a plane vertical to the horizontal direction, the cooling water is affected by gravity. In this case, the cooling water can be kept steady below the space between the surface of the temperature measurement target material and the end surface of the optical glass on the temperature measurement target material side.

Accordingly, the surface temperature measuring apparatus may be configured in a manner that the end surface of the optical glass on the temperature measurement target material side is located at a position where water is present in the space between the end surface of the optical glass on the temperature measurement target material side and the surface of the temperature measurement target material and the light receiving unit of the radiation thermometer receives the thermal radiation light emitted from the surface of the temperature measurement target material through the water that is present in the space between the surface of the temperature measurement target material and the end surface of the optical glass on the temperature measurement target material side. Accordingly, it becomes possible to reduce temperature measurement errors caused by absorption or scattering of the radiant energy by water vapor or scattered water.

Further, with the surface temperature measuring apparatus according to this embodiment, it can be expected that the cooling water is kept steady in the space between the surface of the temperature measurement target material and the end surface of the optical glass on the temperature measurement target material side. Accordingly, the surface temperature measuring apparatus according to this embodiment can reduce temperature measurement errors caused by absorption or scattering of the radiant energy by water vapor or scattered water without the use of purge water or purge air. Further, a temperature decrease of the temperature measurement target material caused by spraying the purge water or the purge air on the temperature measurement target material is not generated, so that the surface temperature of the temperature measurement target material is hardly affected.

For example, in a cooling process of a wheel having a substantially circular cross section, the outer peripheral surface (side surface in the circumferential direction) of the wheel is cooled by water while the wheel is rotated around the axis center. In this case, in order to check whether or not cooling is performed under management of appropriate temperatures, the temperature of the outer peripheral surface of the wheel is measured by a radiation thermometer. In particular, if purge water or purge air is used in measuring the temperature of the wheel, since the rotation speed of the wheel is low, a temperature decrease of the wheel caused by the purge water or the purge air becomes obvious, and it becomes difficult to realize a desired cooling process. Further, since the temperature of the same side surface is measured every time the wheel rotates once, the temperature decrease of the wheel caused by the purge water or the purge air is generated plural times, and accordingly, it becomes more difficult to realize a desired cooling process. With the surface temperature measuring apparatus according to this embodiment, since the surface of the wheel is not cooled by the purge water or the purge air, the surface temperature of the wheel can be measured without damaging the representativeness of the measured temperature.

In this embodiment, it is preferable that the radiation thermometer detects light having any one of wavelength bands of 0.7 to 0.9 μm, 1.0 to 1.2 μm, and 1.6 to 1.8 μm.

Figure 5:
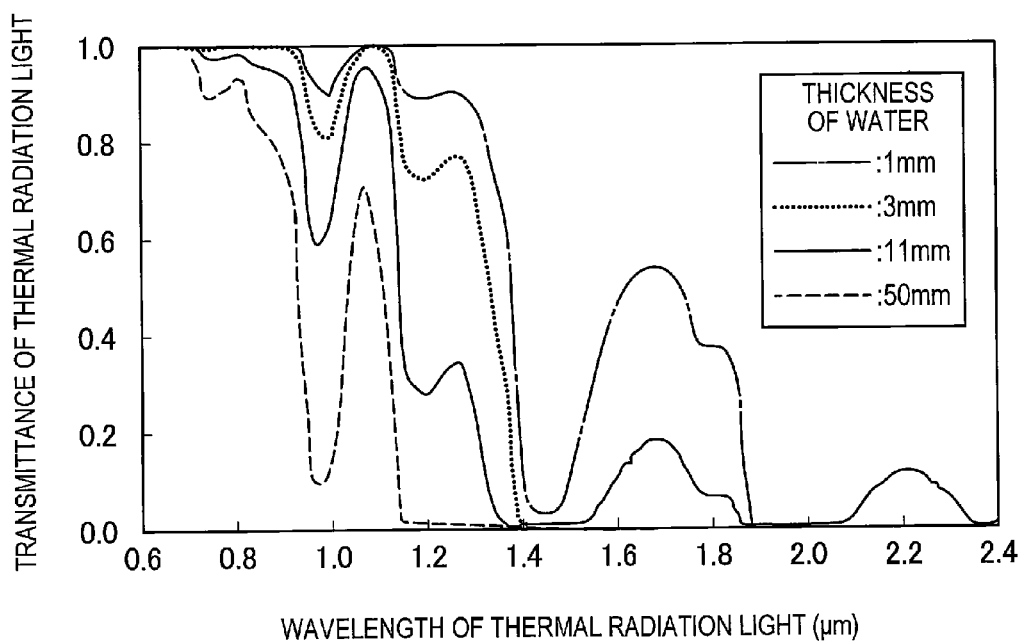
FIG. 5 is a graph showing a relation between a wavelength of thermal radiation light and transmittance of thermal radiation light with respect to a thickness of water.

FIG. 5 is a graph showing the relation between the wavelength of the thermal radiation light and the transmittance thereof with respect to tap water at 28° C. having various thicknesses. From FIG. 5, it is found that the transmittance becomes higher as the thickness of water is larger. Here, in this embodiment, the end surface of the optical glass on the temperature measurement target material side is adjacent to the surface of the temperature measurement target material. For example, when the gap between the surface of the temperature measurement target material and the end surface of the optical glass on the temperature measurement target material side is set to 3 mm or shorter, the transmittance of the thermal radiation light serving as a cause of a temperature measurement error may be higher than the transmittance shown in a case in which the thickness of water is 3 mm.

On the other hand, the cooling water is not always charged completely in a measurement field of the radiation thermometer because the charge state of the cooling water changes when the measured position of the surface temperature moves, for example. That is, in a case in which the detected thermal radiation light does not pass through the cooling water, the transmittance fluctuates substantially.

As shown in FIG. 5, in a case of using a radiation thermometer with detection wavelengths of 0.7 to 0.9 µm, when the thickness of water is 3 mm, the transmittance is approximately 1.0. In this case, even when the change of the charge state of the cooling water is taken into consideration, the transmittance hardly fluctuates, and accordingly, measurement errors are hardly generated.

Further, in a case of using a radiation thermometer with detection wavelengths of 1.0 to 1.2 µm, when the thickness of water is 3 mm, the transmittance is 0.7 or higher. Accordingly, when the charge state of the cooling water that is present in the space between the surface of the temperature measurement target material and the end surface of the optical glass on the temperature measurement target material side changes, the transmittance fluctuates between 0.7 and 1.0. When it is assumed that 0.85, which is the intermediate value therebetween, is the average transmittance, the transmittance fluctuation range is 0.15. From this value, the effect of the transmittance fluctuation range on the measured temperature is calculated to be approximately ±9° C. in the 600° C. region and approximately ±5° C. in the 400° C. region. Accordingly, even when the charge state of the cooling water changes, the surface temperature can be measured accurately.

Further, in a case of using a radiation thermometer with detection wavelengths of 1.6 to 1.8 µm, when the thickness of water is 3 mm, the transmittance is 0.1 or higher. Accordingly, when the charge state of the cooling water that is present in the space between the surface of the temperature measurement target material and the end surface of the optical glass on the temperature measurement target material side changes, the transmittance fluctuates between 0.1 and 1.0. When it is assumed that 0.55, which is the intermediate value therebetween, is the average transmittance, the transmittance fluctuation range is 0.45. From this value, the effect of the transmittance fluctuation range on the measured temperature is calculated to be approximately ±24° C. in the 400° C. region and approximately ±12° C. in the 200° C. region. Accordingly, even when the charge state of the cooling water changes, the surface temperature of the temperature measurement target material can be measured accurately.

According to the above preferred configuration, the radiation thermometer detects light having wavelength bands at which the transmittance of the thermal radiation light is high with respect to the water that is present in the space between the surface of the temperature measurement target material and the end surface of the optical glass on the temperature measurement target material side, and accordingly, measurement errors can be suppressed.

In this embodiment, it is preferable toy include a keeping member configured to keep the gap between the surface of the temperature measurement target material and the end surface of the optical glass on the temperature measurement target material side substantially constant.

According to the preferred configuration, since the gap between the surface of the temperature measurement target material and the end surface of the optical glass on the temperature measurement target material side is kept, the optical glass does not contact the temperature measurement target material. Accordingly, the optical glass can be prevented from being damaged by contacting the temperature measurement target material. Further, since the gap is kept substantially constant, the transmittance does not fluctuate by the change of the thickness of water. Accordingly, the surface temperature of the temperature measurement target material can be measured more accurately.

Further, the growth of the scale to a wheel or the like generates unevenness on the surface of the wheel, and accordingly, the surface of the wheel may contact the end surface of the optical glass, which may damage the optical glass. According to the above preferred configuration, since the gap between the surface of the wheel and the end surface of the optical glass on the wheel side is kept, the surface of the wheel can be prevented from contacting the end surface of the optical glass and the optical glass can be prevented from being damaged. Further, as described above, since the gap is kept substantially constant, the surface temperature of the wheel can be measured more accurately. Note that, as the keeping member, for example, it is possible to use a contact roller mechanism including a roller that is attached to a housing and is pressed toward the surface of the temperature measurement target material so as to be constantly in contact with the surface of the temperature measurement target material.

In a case in which the surface of the temperature measurement target material on which the radiation thermometer detects the thermal radiation light is a plane that is substantially vertical to the horizontal direction, it is preferable that a measured temperature value is calculated by correcting an output value of the radiation thermometer by use of the transmittance of the thermal radiation light with respect to the thickness of water corresponding to a length that is substantially half of the gap between the surface of the temperature measurement target material and the end surface of the optical glass on the temperature measurement target material side.

According to the preferred configuration, the output value of the radiation thermometer is corrected by use of the transmittance of the thermal radiation light with respect to the thickness of water corresponding to a length that is substantially half of the gap between the surface of the temperature measurement target material and the end surface of the optical glass on the temperature measurement target material side. That is, the output value of the radiation thermometer is corrected by estimating, as the transmittance of the thermal radiation light with respect to the thickness of water corresponding to a length that is substantially half of the gap between the surface of the temperature measurement target material and the end surface of the optical glass on the temperature measurement target material side, the average value of fluctuation of transmittance due to the change of the charge state of the water that is present in the space between the surface of the temperature measurement target material and the end surface of the optical glass on the temperature measurement target material side. Accordingly, the surface temperature of the temperature measurement target material can be measured easily and accurately.

In a case in which the surface of the temperature measurement target material on which the radiation thermometer detects the thermal radiation light is the top surface of the temperature measurement target material that is substantially parallel to the horizontal direction, it is preferable that the gap between the surface of the temperature measurement target material and the end surface of the optical glass on the temperature measurement target material side is 2.5 mm or shorter.

According to the preferred configuration, the surface of the temperature measurement target material on which the radiation thermometer detects the thermal radiation light is the top surface of the temperature measurement target material that is substantially parallel to the horizontal direction, and the gap between the surface of the temperature measurement target material and the end surface of the optical glass on the temperature measurement target material side is 2.5 mm or shorter. Accordingly, a surface tension is generated in a manner that the cooling water is charged in substantially the entire space between the surface of the temperature measurement target material and the end surface of the optical glass on the temperature measurement target material side. Accordingly, the transmittance of the thermal radiation light does not fluctuate by the change of the charge state of water, the transmittance of the thermal radiation light depending on the thickness of water becomes substantially constant, and the surface temperature of the temperature measurement target material can be measured with a high accuracy.

In a case in which the surface of the temperature measurement target material on which the radiation thermometer detects the thermal radiation light is a plane that is substantially vertical to the horizontal direction, it is preferable that the light receiving unit of the radiation thermometer receives the thermal radiation light emitted through the water that is present in the space between the surface of the temperature measurement target material and the end surface of the optical glass on the temperature measurement target material side, and that the gap between the surface of the temperature measurement target material and the end surface of the optical glass on the temperature measurement target material side is 1.0 mm or shorter.

According to the preferred configuration, the surface of the temperature measurement target material on which the radiation thermometer detects the thermal radiation light is a plane that is substantially vertical to the horizontal direction, and the cooling water that is present in the space between the surface of the temperature measurement target material and the end surface of the optical glass on the temperature measurement target material side is affected by gravity. In this case, since the gap between the surface of the temperature measurement target material and the end surface of the optical glass on the temperature measurement target material side is 1.0 mm or shorter, a surface tension is generated in a manner that the cooling water is charged in a range corresponding to an area of substantially 60% or more of the entire area of the end surface of the optical glass on the temperature measurement target material side, the area being below the end surface. Accordingly, the light receiving unit of the radiation thermometer receives the thermal radiation light emitted through the water that is present in the space between the surface of the temperature measurement target material and the end surface of the optical glass on the temperature measurement target material side. In other words, the light receiving unit of the radiation thermometer receives the thermal radiation light that is transmitted through a part where the cooling water is charged. Accordingly, the transmittance of the thermal radiation light depending on the thickness of water becomes substantially constant, and the surface temperature of the temperature measurement target material can be measured with a high accuracy.

In this embodiment, it is preferable that a water supply apparatus configured to supply water to the space between the surface of the temperature measurement target material and the end surface of the optical glass on the temperature measurement target material side is provided.

According to the preferred configuration, water is charged in the space between the surface of the temperature measurement target material and the end surface of the optical glass on the temperature measurement target material side. Accordingly, the transmittance of the thermal radiation light does not fluctuate by the change of the charge state of water, and the surface temperature of the temperature measurement target material can be measured with a high accuracy.

Further, in this embodiment, a method of measuring a surface temperature of a temperature measurement target material by detecting, by use of a radiation thermometer, thermal radiation light emitted from a surface of the temperature measurement target material in a cooling process with water is a method of measuring the surface temperature of the temperature measurement target material by interposing an optical glass configured to transmit the thermal radiation light between the temperature measurement target material and a light receiving unit of the radiation thermometer so as to prevent water from entering the space between the optical glass and the light receiving unit of the radiation thermometer, and by locating an end surface of the optical glass on the temperature measurement target material side adjacently to the surface of the temperature measurement target material.

Further, in a case in which the temperature measurement target material is a steel material having a disk shape, a columnar shape, or a cylindrical shape having the outer peripheral surface, such as a wheel having a substantially circular cross section, the temperature of the outer peripheral surface of the temperature measurement target material may be measured. For example, in a cooling process of a wheel, in order to check whether or not cooling is performed under management of appropriate temperatures, the temperature of the outer peripheral surface of the wheel is measured by a radiation thermometer. In this manner, the temperature of the outer peripheral surface of the temperature measurement target material is measured by use of the radiation thermometer while the gap between the outer peripheral surface of the temperature measurement target material and the end surface of the optical glass on the temperature measurement target material side is kept substantially constant, even in the state in which the temperature measurement target material is rotated around the center axis of the temperature measurement target material as the rotation center and the outer peripheral surface of the temperature measurement target material is cooled by water. Accordingly, the temperature of the outer peripheral surface of the temperature measurement target material can be measured accurately.

2. Embodiment of Surface Temperature Measuring Apparatus

Figure 1:
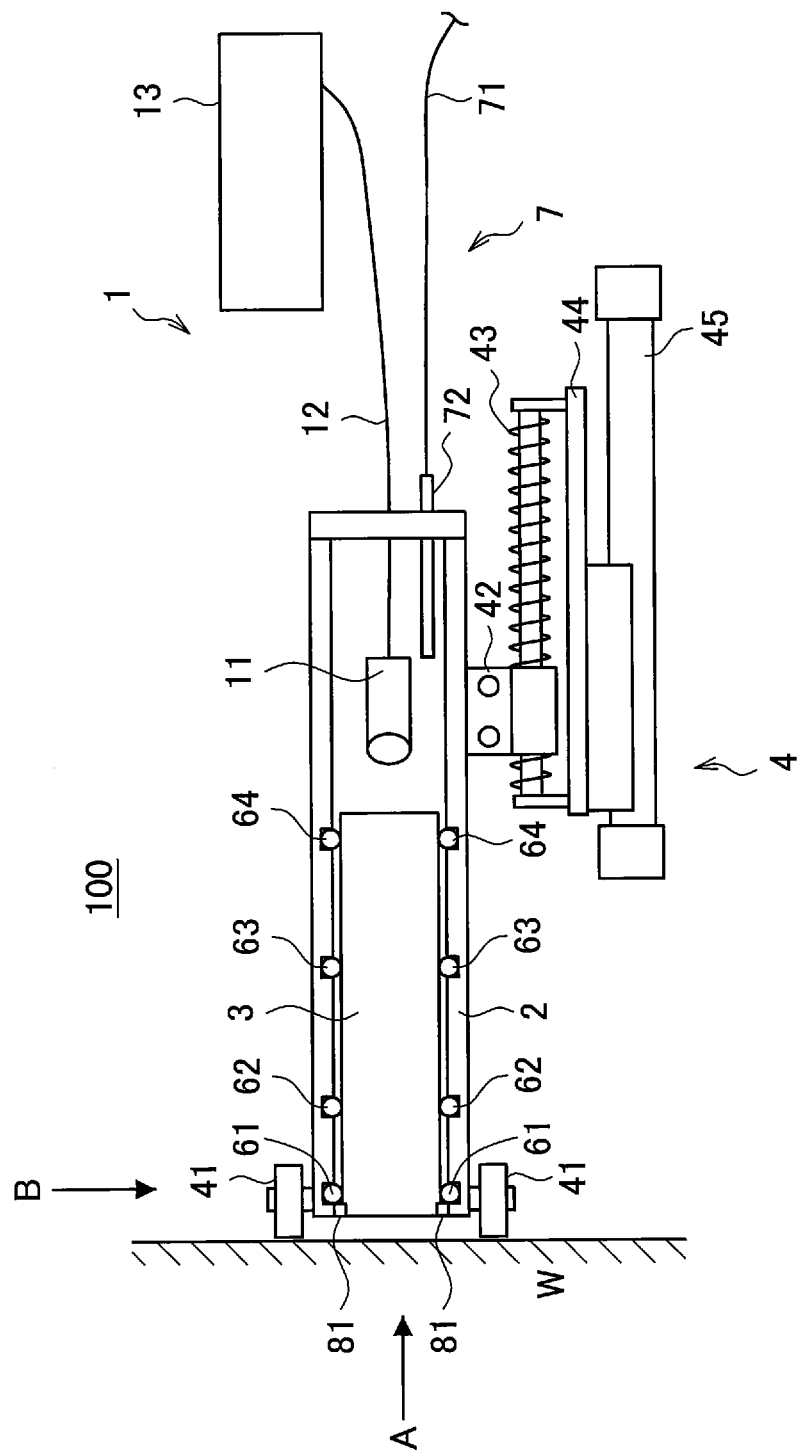
FIG. 1 is a schematic plan view showing a surface temperature measuring apparatus according to an embodiment of the present invention.
Figure 2:
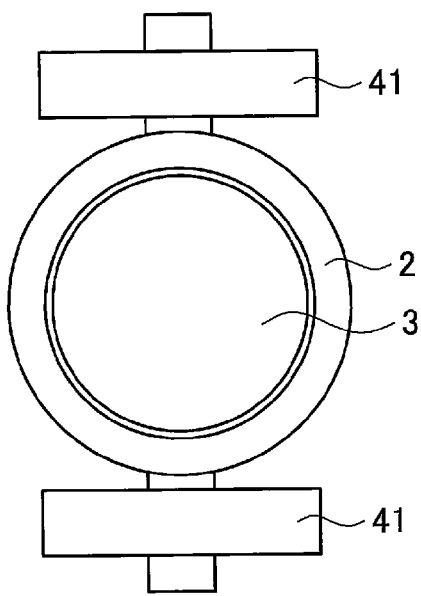
FIG. 2 is a schematic front view showing a surface temperature measuring apparatus according to the embodiment when seen from direction A in FIG. 1.
Figure 3:
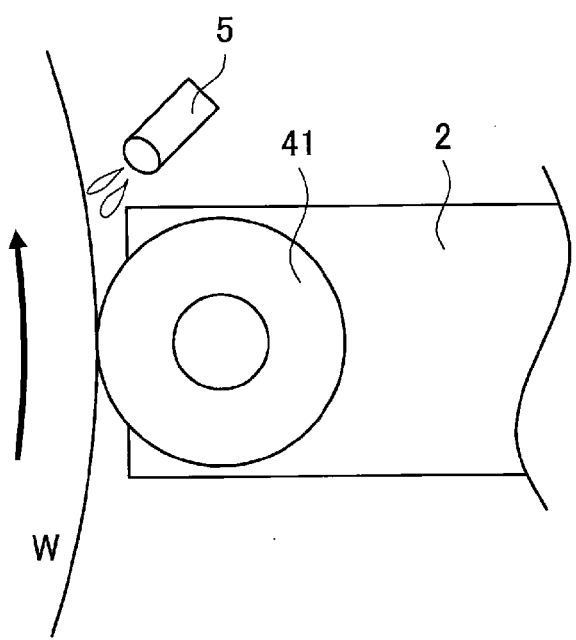
FIG. 3 is a schematic side view showing a surface temperature measuring apparatus when seen from direction B in FIG. 1.

Next, a surface temperature measuring apparatus according to an embodiment of the present invention will be described with reference to appended drawings by taking as an example a case in which a temperature measurement target material is a wheel having a substantially circular cross section. FIG. 1 is a schematic drawing showing a surface temperature measuring apparatus 100 according to an embodiment of the present invention. The schematic drawing shown in FIG. 1 is a plan view of the surface temperature measuring apparatus 100 showing a cross section of the inside of a housing 2. FIG. 2 is a schematic front view of the surface temperature measuring apparatus 100 when seen from direction A in FIG. 1. FIG. 3 is a schematic side view of the surface temperature measuring apparatus 100 when seen from direction B in FIG. 1. As shown in FIG. 1, the surface temperature measuring apparatus 100 according to this embodiment includes a radiation thermometer 1, the housing 2, and an optical glass 3, and is disposed to be opposed to a temperature measurement target material W.

The radiation thermometer 1 is a thermometer that measures temperature by detecting thermal radiation light received by a light receiving unit 11 of the radiation thermometer 1.

The housing 2 has an opening on the temperature measurement target material W side. Further, the housing 2 stores therein at least the light receiving unit 11 of the radiation thermometer 1 among structural elements of the radiation thermometer 1.

The optical glass 3 is fit and sealed in the inside of the housing 2 between the temperature measurement target material W and the light receiving unit 11 of the radiation thermometer 1, and is capable of transmitting the thermal radiation light therethrough.

The radiation thermometer 1 includes the light receiving unit 11, optical fibers 12, and a radiation thermometer main body 13. The optical fibers 12 transfer the thermal radiation light received by the light receiving unit 11 to the radiation thermometer main body 13. Note that the optical fibers 12 might be damaged when used alone, and accordingly, are each covered with a stainless steel flexible hose (not shown). The radiation thermometer main body 13 performs photoelectric conversion on the thermal radiation light that is received by the light receiving unit 11 and is transferred by the optical fibers 12 to convert electric signals into a temperature.

In the surface temperature measuring apparatus 100 according to this embodiment, the housing 2 has the opening on the temperature measurement target material W side and stores the light receiving unit 11 of the radiation thermometer 1 in the inside of the housing 2. Further, the optical glass 3 interposed between the temperature measurement target material W and the light receiving unit 11 of the radiation thermometer 1 transmits the thermal radiation light therethrough. That is, the thermal radiation light emitted from the temperature measurement target material W passes through the opening of the housing 2 and the optical glass 3 and is received by the light receiving unit 11 of the radiation thermometer 1. Accordingly, the radiation thermometer 1 can detect the thermal radiation light emitted from a surface of the temperature measurement target material W.

In the surface temperature measuring apparatus 100 according to this embodiment, the light receiving unit 11 of the radiation thermometer 1 and parts of the optical fibers 12 are stored in the housing 2. In order to secure the heat resistance of the radiation thermometer 1, it is preferable to store only a part of the radiation thermometer 1 in the housing 2 as in this embodiment; however, the present invention is not limited to this example, and the entire radiation thermometer 1 may be stored in the housing 2.

In this embodiment, the light receiving unit 11 has a circular shape with a diameter of 5 mm when seen from the direction A in FIG. 1. The light receiving unit 11 is located at a position where the temperature measuring field on the surface of the temperature measurement target material W is approximately 10 mm in diameter.

In this embodiment, the housing 2 has a ring shape in a cross section, specifically, a cylindrical shape so as to be easily fit and sealed in the optical glass 3 having a substantially circular cross section, as will be described later. However, the present invention is not limited to this example, and any of various shapes can be used as the shape of the housing 2, such as an elliptic cylindrical shape or a square cylindrical shape, depending on the shape of the optical glass 3.

In this embodiment, in order to make the optical glass 3 as compact as possible while securing the temperature measuring field effectively, the optical glass 3 has a substantially circular cross section. Specifically, in FIG. 1 and FIG. 2, the shape of the optical glass 3 is a columnar shape with a diameter of from 10 mm to 20 mm and a length of approximately 100 mm. By setting the length of the optical glass 3 to approximately 100 mm, the heat resistance and waterproof property of the radiation thermometer 1 can be secured, and it is desirable to set the length of the optical glass 3 to more than five times as long as the diameter of the optical glass 3. However, the present invention is not limited to this example, and any of various shapes can be used, such as an elliptic columnar shape or a square columnar shape.

In this embodiment, since an end surface of the optical glass 3 on the temperature measurement target material W side is adjacent to the surface of the temperature measurement target material W, water vapor, scattered water, and cooling water are unlikely to enter a space between the surface of the temperature measurement target material W and the end surface of the optical glass 3 on the temperature measurement target material W side. Further, even when cooling water and the like enter, the cooling water entering the space between the surface of the temperature measurement target material W in a cooling process with water and the end surface of the optical glass 3 on the temperature measurement target material W side will have a surface tension so as to be kept steady in this space. Accordingly, it becomes possible to reduce temperature measurement errors caused by absorption or scattering of the radiant energy by water vapor or scattered water.

In this embodiment, the shape of the end surface of the optical glass 3 on the temperature measurement target material W side is planar. Accordingly, even when the surface shape (curvature) of the temperature measurement target material W changes, the cooling water entering the space between the surface of the temperature measurement target material W and the end surface of the optical glass 3 on the temperature measurement target material W side will easily have a surface tension averagely. However, the present invention is not limited to this example, and the shape of the end surface of the optical glass 3 on the temperature measurement target material W side may be a shape in accordance with the surface shape of the temperature measurement target material W.

Specifically, the shape of the end surface of the optical glass 3 on the temperature measurement target material W side may be a shape having a substantially constant gap between the surface of the temperature measurement target material W and the end surface of the optical glass 3 on the temperature measurement target material W side across the end surface of the optical glass 3 on the temperature measurement target material W side. More specifically, the end surface of the optical glass 3 on the temperature measurement target material W side may have a curvature so as to be concentric with the surface of the temperature measurement target material W. In particular, in a case in which the wheel as the temperature measurement target material W has a constant outer diameter (in a case in which the temperature measurement target material W has a constant surface shape), by forming the shape of the end surface of the optical glass 3 on the temperature measurement target material W side as a shape having a curvature so as to be concentric with the surface of the temperature measurement target material W having the constant outer diameter, it is considered that the cooling water entering the space between the surface of the temperature measurement target material W and the end surface of the optical glass 3 on the temperature measurement target material W side will have the surface tension more easily.

The surface temperature measuring apparatus 100 according to this embodiment further includes sealing members 61 to 64, an optical glass energizing member (not shown), and a stopper 81. The optical glass 3 according to this embodiment is fit and sealed in the inside of the housing 2 with the sealing members 61 to 64. In this embodiment, as shown in FIG. 1, the sealing members 61 to 64 are fit between the housing 2 and the optical glass 3. Further, in this embodiment, of the sealing members 61 to 64, the sealing member 61 that is the closest to the temperature measurement target material W is preferably a metal ring with high heat resistance, formed from a soft metal such as lead. Meanwhile, the sealing members 62 to 64 are each preferably an O ring formed from a heat resistant rubber having a high waterproof property, formed from a resin such as silicon or Teflon (registered trademark). Accordingly, it becomes possible to secure the heat resistance and waterproof property of the radiation thermometer 1 and to suppress damage of the optical glass 3 by impact.

The optical glass energizing member is a spring (not shown) provided in the inside of the housing 2, and energizes the optical glass 3 toward the surface of the temperature measurement target material W. Further, the stopper 81 is locked at the end of the optical glass 3 on the temperature measurement target material W side so that the optical glass 3 should not be extruded out of the housing 2. Accordingly, the optical glass 3 is fixed firmly between the optical glass energizing member and the stopper 81, and accordingly, it becomes possible to prevent the optical glass 3 from being moved by impact to contact the housing 2 or the radiation thermometer 1 to be damaged, and to prevent the radiation thermometer 1 from being damaged.

In this embodiment, as a preferred embodiment, the radiation thermometer 1 detects light having any one of wavelength bands of 0.7 to 0.9 μm, 1.0 to 1.2 μm, and 1.6 to 1.8 μm. Specifically, the radiation thermometer main body 13 includes a Si photodiode or an InGaAs photodiode as a detector that performs photoelectric conversion on the thermal radiation light transferred by the optical fibers 12 and outputs current in accordance with the light amount. After amplifying output current from the Si photodiode or the InGaAs photodiode, the radiation thermometer main body 13 performs current-voltage conversion and AD conversion and corrects the emissivity of the temperature measurement target material W to convert electric signals into a temperature.

Further, the radiation thermometer main body 13 includes an optical filter that transmits only light having any one of wavelength bands of 0.7 to 0.9 μm, 1.0 to 1.2 μm, and 1.6 to 1.8 μm between the surface of the temperature measurement target material W and the detector of the radiation thermometer 1, more specifically, between the end of the optical fibers 12 on the radiation thermometer main body 13 side and the Si photodiode or the InGaAs photodiode. Thus, the wavelength of the thermal radiation light detected by the radiation thermometer 1 is any one of wavelength bands of 0.7 to 0.9 μm, 1.0 to 1.2 μm, and 1.6 to 1.8 μm. Note that, in a case of using the Si photodiode as the detector, an optical filter that transmits only light having any one of wavelength bands of 0.7 to 0.9 μm and 1.0 to 1.2 μm is provided. Further, in a case of using the InGaAs photodiode as the detector, an optical filter that transmits only light having a wavelength band of 1.6 to 1.8 μm is provided.

According to the preferred configuration, as described above, the radiation thermometer 1 detects light having wavelength bands at which the transmittance of the thermal radiation light is high with respect to the water that is present in the space between the surface of the temperature measurement target material W and the end surface of the optical glass 3 on the temperature measurement target material W side, and accordingly, measurement errors can be suppressed.

The optical glass 3 according to this embodiment is a quartz rod that transmits near infrared light. Since a quartz rod has high transmittance of light having a wavelength of 2 μm or shorter, measurement errors are hardly generated by absorption or the like of the thermal radiation light by the quarts rod. However, the present invention is not limited to this example, and an optical glass that transmits near infrared light, such as sapphire glass or calcium fluoride ($CaF_2$), may also be used as the optical glass 3.

As a preferred embodiment, the surface temperature measuring apparatus 100 according to this embodiment includes a keeping member that keeps the gap between the surface of the temperature measurement target material W and the end surface of the optical glass 3 on the temperature measurement target material W side substantially constant. Specifically, the surface temperature measuring apparatus 100 according to this embodiment includes, as the keeping member, a contact roller mechanism 4. As shown in FIG. 1, the contact roller mechanism 4 includes a roller 41, energizing members 42 and 44, an energizing spring 43, and an air cylinder 45.

Since the energizing member 42 is attached to the housing 2, when the air cylinder 45 energizes the energizing member 44 toward the temperature measurement target material W side, the energizing member 42 energizes the housing 2 toward the temperature measurement target material W side via the energizing spring 43. Thus, the roller 41 provided on the housing 2 is pressed toward the surface of the temperature measurement target material W so as to be constantly in contact with the surface of the temperature measurement target material W. That is, the gap between the surface of the temperature measurement target material W and the end surface of the optical glass 3 on the temperature measurement target material W side is decided depending on the position where the roller 41 is attached to the housing 2 and the diameter size of the roller 41, and the gap is kept substantially constant. Accordingly, it becomes possible to prevent the optical glass 3 from being damaged by contacting the temperature measurement target material W. Further, since the transmittance does not fluctuate by the change of the thickness of water, the surface temperature of the temperature measurement target material W can be measured more accurately. Note that two rollers 41 are provided on the housing 2 in this embodiment; however, the present invention is not limited to this example, and three or more rollers may be provided.

The temperature measurement target material W according to this embodiment is a wheel having a substantially circular cross section, as described above. As shown in FIG. 1 and FIG. 3, the surface temperature measuring apparatus 100 is configured to be capable of measuring the temperature of the outer peripheral surface of the wheel by rolling motion of the roller 41 following the rotation of the wheel.

As shown in this embodiment, in a case in which the surface of the temperature measurement target material W on which the radiation thermometer 1 detects the thermal radiation light is a plane that is substantially vertical to the horizontal direction, as a preferred embodiment, the surface temperature measuring apparatus 100 according to this embodiment calculates a measured temperature value by correcting the output value of the radiation thermometer 1 by use of the transmittance of the thermal radiation light with respect to the thickness of water corresponding to a length that is substantially half of the gap between the surface of the temperature measurement target material W and the end surface of the optical glass 3 on the temperature measurement target material W side.

According to the preferred embodiment, the surface temperature measuring apparatus 100 corrects the output value of the radiation thermometer 1 by use of the transmittance of the thermal radiation light with respect to the thickness of water corresponding to a length that is substantially half of the gap between the surface of the temperature measurement target material W and the end surface of the optical glass 3 on the temperature measurement target material W side. At this time, the correction of the radiation thermometer 1 is performed by estimating, as the transmittance of the thermal radiation light with respect to the thickness of water corresponding to a length that is substantially half of the gap between the surface of the temperature measurement target material W and the end surface of the optical glass 3 on the temperature measurement target material W side, the average value of fluctuation of transmittance due to the change of the charge state of the water that is present in the space between the surface of the temperature measurement target material W and the end surface of the optical glass 3 on the temperature measurement target material W side.

FIG. 6 is a graph showing results of observation of the charge state of the water that is present between a steel sheet and an end surface of the optical glass 3 by the gap between the top surface (horizontal plane) of the steel sheet that is substantially parallel to the horizontal direction or the plane (vertical plane) of the steel sheet that is substantially vertical to the horizontal direction and the end surface of the optical glass 3. Specifically, the optical glass 3 has a columnar shape with a diameter of 10 mm or 20 mm. As shown in FIG. 7, the water that is present between the steel sheet and the end surface of the optical glass 3 is imaged by a camera when the gap changes, and, as a charge rate, a range of the imaged outline of water occupying the measurement field of the light receiving unit 11 of the radiation thermometer 1 on the end surface of the optical glass 3 is measured. As for each of the horizontal plane and the vertical plane, charge rates of water are measured three times in the set gap, and FIG. 6 shows average values of the measured charge rates of water.

As shown in this embodiment, in a case in which the surface of the temperature measurement target material W on which the radiation thermometer 1 detects the thermal radiation light is a plane that is substantially vertical to the horizontal direction, as a preferred embodiment, the light receiving unit 11 of the radiation thermometer 1 receives the thermal radiation light emitted through the water that is present in the space between the surface of the temperature measurement target material W and the end surface of the optical glass 3 on the temperature measurement target material W side, and the gap between the surface of the temperature measurement target material W and the end surface of the optical glass 3 on the temperature measurement target material W side is set to 1.0 mm or shorter.

As shown in FIG. 6, on the vertical plane of the steel sheet, the water that is present between the steel sheet and the end surface of the optical glass 3 is affected by gravity. Accordingly, in a case in which the gap is 1.0 mm or shorter, a surface tension is generated in a manner that water is charged in a range corresponding to an area of substantially 60% or more of the entire area of the end surface of the optical glass 3, the area being below the end surface. That is, according to the preferred embodiment, a surface tension may be generated in a manner that the cooling water is charged in a range corresponding to an area of substantially 60% or more of the entire area of the end surface of the optical glass 3 on the temperature measurement target material W side, the area being below the end surface. Accordingly, when the light receiving unit 11 of the radiation thermometer 1 receives the thermal radiation light transmitted through a part where the cooling water is charged, the transmittance of the thermal radiation light depending on the thickness of water becomes substantially constant, and the surface temperature of the temperature measurement target material W can be measured with a high accuracy.

FIG. 8 shows an example of the relation between the charge rate of water and the temperature measurement error. In the example in FIG. 8, the temperature of a temperature measurement target at 500° C. is measured by the radiation thermometer 1 with detection wavelengths of 1.0 to 1.2 μm. Let us assume that the measurement field of the light receiving unit 11 of the radiation thermometer 1 is substantially equal to the outer diameter of the optical glass 3 on the end surface of the optical glass 3, as shown in FIG. 7. In this case, the charge rate of the water that is present between the surface of the temperature measurement target and the end surface of the optical glass 3 on the temperature measurement target side with respect to the measurement field of the light receiving unit 11 is changed, so that temperature measurement errors of the radiation thermometer are calculated. From FIG. 8, it is found that the temperature measurement errors decrease as the charge rate of water increases. When the charge rate of water is 60% or higher, the temperature measurement errors can be suppressed to be within 3° C.

Note that it is not necessary that the measurement field of the light receiving unit 11 of the radiation thermometer 1 is substantially equal to the outer diameter of the optical glass 3 on the end surface of the optical glass 3. For example, as shown in FIG. 9, the measurement field of the light receiving unit 11 of the radiation thermometer 1 may be set to be smaller than the outer diameter of the optical glass 3 on the end surface of the optical glass 3. Accordingly, it becomes possible to set the measurement field of the light receiving unit 11 of the radiation thermometer 1 as the part where water is charged, even when the part is small with respect to the area of the end surface of the optical glass 3, and as the charge rate of water where the temperature measurement errors are within a predetermined range.

On the other hand, unlike in this embodiment, in a case in which the surface of the temperature measurement target material W on which the radiation thermometer 1 detects the thermal radiation light is the top surface of the temperature measurement target material W that is substantially parallel to the horizontal direction, it is preferable that the gap between the surface of the temperature measurement target material W and the end surface of the optical glass 3 on the temperature measurement target material W side is 2.5 mm or shorter.

As shown in FIG. 6, on the horizontal plane of the steel sheet, it is found that, in a case in which the gap is 2.5 mm or shorter, a surface tension is generated in a manner that water is charged in substantially the entire space between the steel sheet and the end surface of the optical glass 3. That is, in the preferred configuration, the cooling water may be charged in the space between the surface of the temperature measurement target material W and the end surface of the optical glass 3 on the temperature measurement target material W side. Accordingly, the transmittance of the thermal radiation light does not fluctuate by the change of the charge state of water, the transmittance of the thermal radiation light depending on the thickness of water (transmittance in a case in which the thickness of water is the gap) becomes substantially constant, and the surface temperature of the temperature measurement target material can be measured with a high accuracy.

The surface temperature measuring apparatus 100 according to this embodiment may include a water supply apparatus 5. As shown in FIG. 3, the water supply apparatus 5 according to this embodiment is disposed outside the housing 2 so that water can be supplied to the space between the temperature measurement target material W and the end surface of the optical glass 3 on the temperature measurement target material W side. That is, by supplement of water by the water supply apparatus 5, water is charged in the space between the temperature measurement target material W and the end surface of the optical glass 3 on the temperature measurement target material W side. Accordingly, the transmittance of the thermal radiation light does not fluctuate by the change of the charge state of water, and the surface temperature of the temperature measurement target material W can be measured with a high accuracy.

Figure 4:
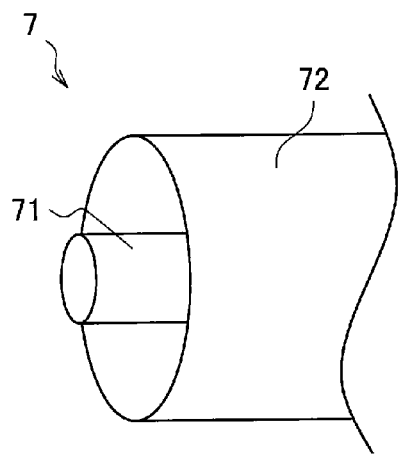
FIG. 4 is a schematic diagram showing a purge mechanism in an inside of a housing.

As a preferred embodiment, the surface temperature measuring apparatus 100 according to this embodiment further includes a purge mechanism 7. FIG. 4 is a schematic diagram of the purge mechanism 7 in the inside of the housing 2. As shown in FIG. 1 and FIG. 4, the purge mechanism 7 according to this embodiment is constituted of an air nozzle 71 and a hose 72. The air nozzle 71 is disposed in the inside of the hose 72. Further, the air nozzle 71 and the hose 72 are inserted to the inside of the housing 2.

The air nozzle 71 ejecting purge air to the inside of the housing 2 can prevent water from entering the inside of the housing 2 and make a space on the periphery of the of the light receiving unit 11 of the radiation thermometer 1 stored in the inside of the housing 2 have a clean atmosphere. Accordingly, it becomes possible to prevent measurement errors from being generated by a change of a measurement region where the temperature is measured due to condensation on the light receiving unit 11. The hose 72 also communicates with the outside of the housing 2. Since the temperature measurement target material W side of the housing 2 is fit and sealed in the optical glass 3, purge air ejected from the air nozzle 71 is released outside through the hose 72.

Note that there is no particular limitation on the kind of purge air as long as the purge air is a colorless gas that does not shield the thermal radiation light, such as dry air or nitrogen. Further, there is no particular limitation on the purge system as long as the clean atmosphere can be maintained.

FIG. 10 is a schematic diagram showing an experimental apparatus for evaluating the accuracy of surface temperature measurement on a vertical plane of a steel sheet in a cooling process with water. Specifically, as shown in FIG. 10, a heater 92 is disposed in an airtight container 90. The airtight container 90 has a quartz window 94 on a temperature measurement plane. The surface temperature measuring apparatus 100 according to this embodiment is disposed in a manner that the gap between the surface of the quartz window 94 and the end surface of the optical glass 3 is 1 mm. Further, the temperature in the airtight container 90 can be measured precisely by a thermocouple 96 disposed in the airtight container 90.

FIG. 11 is a graph showing temperature measurement results obtained by the surface temperature measuring apparatus 100 before and after water is sprayed on the quartz window 94 from a water nozzle 98 after the heater 92 of the experimental apparatus shown in FIG. 10 is heated and the temperature in the airtight container 90 is increased to a predetermined temperature. As shown in FIG. 11, before water cooling is started, the temperature measurement results show temperatures that are substantially equal to those measured by the thermocouple 96. After water cooling is started, the temperature measurement results show a temperature measurement error of a decrease of approximately 4° C. from the temperature measured by the thermocouple 96. Since water is charged steadily in the space between the surface of the quartz window 94 and the end surface of the optical glass 3, the transmittance of the thermal radiation light may affect the thickness of water, which is 1 mm, and the decrease of approximately 4° C. may be caused in temperature measurement. That is, when the output value of the radiation thermometer 1 is corrected by use of the transmittance of the thermal radiation light with respect to the thickness of water and the measured temperature value is calculated, the temperature can be measured with a high accuracy.

Note that the temperature measurement results obtained by the surface temperature measuring apparatus 100 vibrate largely during the water cooling because variations are generated by the charge state of the water that is present between the surface of the quartz window 94 and the end surface of the optical glass 3. However, the vibration degree in the temperature measurement results is approximately 3° C. Even when this vibration degree is taken into consideration, the temperature measurement results can be obtained with a temperature measurement error of a decrease of approximately 3 to 6° C. from the temperature measured by the thermocouple 96, which can be said to be accurate temperature measurement. Further, when the measured temperature value is calculated by obtaining the average value of this vibration degree, the temperature can be measured with a high accuracy.

The present invention is not limited to the configurations according to the above-described embodiment, and various modifications are possible without departing from the scope of the present invention. For example, although the above embodiment has shown a case in which the temperature measurement target material W is a wheel, the temperature measurement target material W may be a steel pipe, steel sheet, or the like without limitation.

Further, in the above-described embodiment, although the optical glass 3 is fit and sealed in the inside of the housing 2, the present invention is not limited to this example. For example, as a modification example of the optical glass 3 according to this embodiment, the optical glass 3 may be interposed between the temperature measurement target material W and the light receiving unit of the radiation thermometer 1 so as to prevent water from entering the space between the optical glass 3 and the light receiving unit 11 of the radiation thermometer 1. Specifically, for example, the optical glass 3 may be a long optical glass extending in the direction vertical to the horizontal plane (the direction vertical to the thermal radiation light emitted from the temperature measurement target material W to the light receiving unit 11 of the radiation thermometer 1). Accordingly, even with a configuration in which the light receiving unit 11 is stored in the inside of the housing 2 and the optical glass 3 is not fit and sealed in the inside of the housing 2, water may be unlikely to enter the space between the optical glass 3 and the light receiving unit 11 of the radiation thermometer 1.

REFERENCE SIGNS LIST 1 radiation thermometer
2 housing
3 optical glass
4 contact roller mechanism
5 water supply apparatus
7 purge mechanism
11 light receiving unit
12 optical fiber
13 radiation thermometer main body
41 roller
42, 44 energizing member
43 energizing spring
45 air cylinder
61 to 64 sealing member
71 air nozzle
72 hose
W temperature measurement target material

The invention claimed is:

1. A surface temperature measuring apparatus comprising:
a radiation thermometer configured to detect thermal radiation light emitted from a surface of a temperature measurement target material in a cooling process with water;
a housing having an opening on a temperature measurement target material side, the housing storing, in an inside of the housing, at least a light receiving unit of the radiation thermometer among structural elements of the radiation thermometer; and
an optical glass that is fit and sealed in the inside of the housing between the temperature measurement target material and the light receiving unit of the radiation thermometer, the optical glass being configured to transmit the thermal radiation light,
wherein the surface of the temperature measurement target material on which the radiation thermometer detects the thermal radiation light is a plane that is approximately vertical to a horizontal direction, and
wherein the optical glass has, on the temperature measurement target material side, an end surface that is adjacent to the surface of the temperature measurement target material.

2. The surface temperature measuring apparatus according to claim 1,
wherein the end surface of the optical glass on the temperature measurement target material side is located at a position where water is present in a space between the end surface of the optical glass on the temperature measurement target material side and the surface of the temperature measurement target material, and
wherein the light receiving unit of the radiation thermometer receives the thermal radiation light emitted from the surface of the temperature measurement target material through water that is present in the space between the surface of the temperature measurement target material and the end surface of the optical glass on the temperature measurement target material side.

3. The surface temperature measuring apparatus according to claim 1,
wherein the radiation thermometer detects light having any one of wavelength bands of 0.7 to 0.9 µm, 1.0 to 1.2 µm, and 1.6 to 1.8 µm.

4. The surface temperature measuring apparatus according to claim 1, comprising:
a keeping member configured to keep a gap between the surface of the temperature measurement target material and the end surface of the optical glass on the temperature measurement target material side substantially constant.

5. The surface temperature measuring apparatus according to claim 4,
wherein a measured temperature value is calculated by correcting an output value of the radiation thermometer by use of a transmittance of the thermal radiation light with respect to a thickness of water corresponding to a length that is substantially half of the gap between the surface of the temperature measurement target material and the end surface of the optical glass on the temperature measurement target material side.

6. The surface temperature measuring apparatus according to claim 4,
wherein the light receiving unit of the radiation thermometer receives the thermal radiation light emitted through the water that is present in the space between the surface of the temperature measurement target material and the end surface of the optical glass on the temperature measurement target material side, and
wherein the gap between the surface of the temperature measurement target material and the end surface of the optical glass on the temperature measurement target material side is 1.0 mm or shorter.

7. The surface temperature measuring apparatus according to claim 1, comprising:
a water supply apparatus configured to supply water to the space between the surface of the temperature measurement target material and the end surface of the optical glass on the temperature measurement target material side.

8. A surface temperature measuring apparatus comprising:
a radiation thermometer configured to detect thermal radiation light emitted from a surface of a temperature measurement target material in a cooling process with water;
a housing having an opening on a temperature measurement target material side, the housing storing, in an inside of the housing, at least a light receiving unit of the radiation thermometer among structural elements of the radiation thermometer;
an optical glass that is fit and sealed in the inside of the housing between the temperature measurement target material and the light receiving unit of the radiation thermometer, the optical glass being configured to transmit the thermal radiation light; and a keeping member configured to keep a gap between a surface of the temperature measurement target material and an end surface of the optical glass on the temperature measurement target material side substantially constant, wherein the surface of the temperature measurement target material on which the radiation thermometer detects the thermal radiation light is a plane that is approximately vertical to a horizontal direction.

9. A surface temperature measuring method of measuring a surface temperature of a temperature measurement target material by detecting, by use of a radiation thermometer, thermal radiation light emitted from a surface of the temperature measurement target material in a cooling process with water, the method comprising:

interposing an optical glass configured to transmit the thermal radiation light between the temperature measurement target material and a light receiving unit of the radiation thermometer; and locating an end surface of the optical glass on a temperature measurement target material side adjacently to the surface of the temperature measurement target material and measuring the surface temperature of the temperature measurement target material, wherein the surface of the temperature measurement target material on which the radiation thermometer detects the thermal radiation light is a plane that is approximately vertical to a horizontal direction.

10. The surface temperature measuring method according to claim 9, wherein the temperature measurement target material is a steel material having a disk shape, a columnar shape, or a cylindrical shape having an outer peripheral surface, and wherein, when measuring the surface temperature of the temperature measurement target material, a temperature of the outer peripheral surface of the temperature measurement target material is measured by use of the radiation thermometer while the gap between the outer peripheral surface of the temperature measurement target material and the end surface of the optical glass on the temperature measurement target material side is kept substantially constant, in a state in which the temperature measurement target material is rotated around a center axis of the temperature measurement target material as a rotation center and the outer peripheral surface of the temperature measurement target material is cooled by water.

* * * * *